(12) United States Patent
Davis

(10) Patent No.: US 10,928,003 B2
(45) Date of Patent: Feb. 23, 2021

(54) METHOD FOR SIGNALING THE POSITION OF A SAFETY DEVICE, AND SAFETY SWITCHING SYSTEM

(71) Applicant: Phoenix Contact GmbH & Co. KG, Blomberg (DE)

(72) Inventor: Simon Davis, Schieder Schwalenberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 66 days.

(21) Appl. No.: 16/321,182

(22) PCT Filed: Jul. 19, 2017

(86) PCT No.: PCT/EP2017/068281
§ 371 (c)(1),
(2) Date: Jan. 28, 2019

(87) PCT Pub. No.: WO2018/019684
PCT Pub. Date: Feb. 1, 2018

(65) Prior Publication Data
US 2019/0170296 A1 Jun. 6, 2019

(30) Foreign Application Priority Data

Jul. 29, 2016 (DE) ...................... 10 2016 114 135.6

(51) Int. Cl.
*F16P 3/10* (2006.01)
*G05B 9/02* (2006.01)
*G05B 19/048* (2006.01)

(52) U.S. Cl.
CPC .................................... *F16P 3/10* (2013.01); *G05B 9/02* (2013.01); *G05B 19/048* (2013.01)

(58) Field of Classification Search
CPC ...... F16P 3/10; F16P 3/00; G05B 9/02; G05B 19/048
See application file for complete search history.

(56) References Cited

U.S. PATENT DOCUMENTS

2002/0067259 A1* 6/2002 Fufidio ................ G08B 13/183
340/541
2015/0177718 A1* 6/2015 Vartiainen .............. G05B 15/02
700/83

FOREIGN PATENT DOCUMENTS

DE 10138342 A1 2/2003
DE 102007018423 A1 10/2008
(Continued)

OTHER PUBLICATIONS

Authorized Officer Nora Lindner, International Preliminary Report on Patentability issued in PCT Application No. PCT/EP2017/068281 dated Feb. 7, 2019.
(Continued)

*Primary Examiner* — Carlos Amaya
(74) *Attorney, Agent, or Firm* — Kaplan Breyer Schwarz, LLP

(57) ABSTRACT

A method for signaling the position of a safety device with respect to a safety zone to be monitored with regard to the safety device, as well as a safety switch system suitable for carrying out the method. For monitoring the safety zone, the position of the safety device with respect to the safety zone is detected with a detection device, and the safety zone is divided into a first subzone and at least a second subzone. If the position of the safety device is detected within the first subzone, this is recognized as the first condition; if the position of the safety device is detected in the area of the second subzone, this is recognized as a second condition; and if the position of the safety device is not detected within the first subzone or in the area of the second subzone, this (Continued)

is recognized as a third condition. Furthermore, recognition of the third condition is signaled by a safety-oriented release signal for releasing of a predetermined safety-oriented reaction and/or recognition of the first and/or second condition(s) is signaled by an information signal with data pertaining to the respective condition to a display device, in particular a display device in a wireless connection.

9 Claims, 2 Drawing Sheets

(56) References Cited

FOREIGN PATENT DOCUMENTS

| | | |
|---|---|---|
| DE | 102012107715 B3 | 9/2013 |
| DE | 102013102108 A1 | 9/2013 |
| EP | 0986176 A2 | 3/2000 |
| EP | 1820611 A1 | 8/2007 |
| WO | 90/13180 A1 | 11/1990 |

OTHER PUBLICATIONS

Office Action issued in German patent application No. 102016114135.6, dated Jun. 2, 2017, 6 pp.
Authorized Officer: Afanasiev, Andrey, International Search Report and Written Opinion issued in PCT application No. PCT/EP2017/068281, dated Oct. 20, 2017, 9 pp.

* cited by examiner

METHOD FOR SIGNALING THE POSITION OF A SAFETY DEVICE, AND SAFETY SWITCHING SYSTEM

FIELD

The invention relates to a method for signaling the position of a safety device with respect to a safety zone to be monitored with regard to the safety device as well as a safety switch system suitable for implementation.

BACKGROUND

Safety switches for monitoring the position of protection devices separating a safety area in machines, for example, are known for safely shutting down the machine in reaction to the fact that such a protection device that is to be separated has taken a safety-critical position. It is thus often necessary to shut down safety-critical machines and/or stop machine movements when opening or removing such a protection device. The protection devices must not be bypassed or susceptible to manipulation. Additionally, certain applications require a protection device to be locked until a safety-critical (production) process, which is therefore hazardous, has been concluded.

Such a protection device may be a door, for example, so that the machine is shut down because of the door being opened, in order to safely counteract a safety-critical condition and prevent any potential hazards to humans, for example. If such a door can "sag" in relation to the machine frame in the course of operation, for example, it is possible for the machine to depart from the safe response range of the safety switch and unintentionally cause the machine to be shut down despite the fact that there is no actual safety-critical condition. Thus, if the position of a protection device is recognized as being critical to safety, although there no actual safety-critical condition, this will affect the productivity of the machine and result in unplanned maintenance.

SUMMARY

The object of the invention is to show a way in which it could be possible to significantly reduce the risk of detecting the position of a safety device as being safety-critical despite the fact that there is no actual safety-critical condition.

This object is achieved by a method and a safety switch system having the features of the independent claims. Expedient embodiments and refinements are the subject matter of the dependent claims.

Consequently, the invention proposes a method for signaling the position of a safety device with respect to a safety zone to be monitored with regard to the safety device, wherein the position of the safety device with respect to the safety zone is monitored by a detection device for monitoring the safety zone, said safety zone being divided into a first subzone and at least one second subzone, and wherein, in response to a detected position of the safety device within the first subzone, this is recognized as the first condition; in response to detection of the safety device in the area of a second subzone, this is recognized as the second condition, and the third condition is recognized if the safety device is not detected within the first subzone nor in the area of at least one second subzone. Next, recognition of the third condition is signaled by a safety-oriented release signal for releasing of a predetermined safety-oriented reaction, and/or recognition of the first and/or second condition(s) is signaled by an information signal with data pertaining to the respective condition to a display device that is in wireless connection in particular.

For practical implementation of the method according to the invention in particular, the invention also proposes a safety switch system with a safety switch having a safety device and a detection device, wherein the detection device is equipped to monitor the position of the safety device within a safety zone, which is divided into a first subzone and at least one second subzone. The safety switch is equipped to recognize at least three conditions as a function of the position of the safety device with respect to the safety zone, wherein, in response to detection of the position of the safety device within the first subzone, this can be recognized as the first condition; in response to detection of the position of the safety device in the area of a second subzone, this can be recognized as the second condition, and the third condition can be recognized if the safety device cannot be detected either within the first subzone or in the area of the second subzone. Furthermore, the safety switch is equipped so that recognition of the third condition can be signaled by a safety-oriented release signal for releasing a predetermined safety-oriented reaction and/or recognition of the first and/or second condition(s) can be signaled by an information signal having data pertaining to the respective condition to a display device, in particular such a device that is in a wireless connection.

An important advantage of the invention can thus be seen in the fact that, because of the different subzones of a safety zone to be monitored, in particular preset subzones, a transition area can be used and/or made available, with the use of which, instead of previous more or less binary switching between two conditions, i.e., in particular between a safety-critical condition and a non-safety-critical condition, a transition condition can be utilized, i.e., with which in particular a condition that does not conform to a safety-relevant stipulation but can nevertheless be signaled as a non-safety-critical classifiable condition can be differentiated from a condition that is non-safety-critical per se and a condition that is safety-critical per se and accordingly can also be signaled differently as to the safety orientation manner based on the application.

If, while utilizing the subject matter according to the invention, for example, a safety device which separates a safety area in machines is monitored, e.g., a door, on which the safety device is mounted, then by means of this transition area, for example, it is possible to detect that such a door has become slack in relation to the machine frame in the course of operation as such, although the system or process has already departed from the "first" secure response or detection range of the safety switch, i.e., within the first subzone, and consequently the machine cannot be brought to a standstill unintentionally in the absence of an actual safety-critical condition.

BRIEF DESCRIPTION OF THE DRAWINGS

Additional advantages and features of the invention are derived from the following description of preferred embodiments on the basis of the accompanying drawings in which.

DETAILED DESCRIPTION

Figure 1:
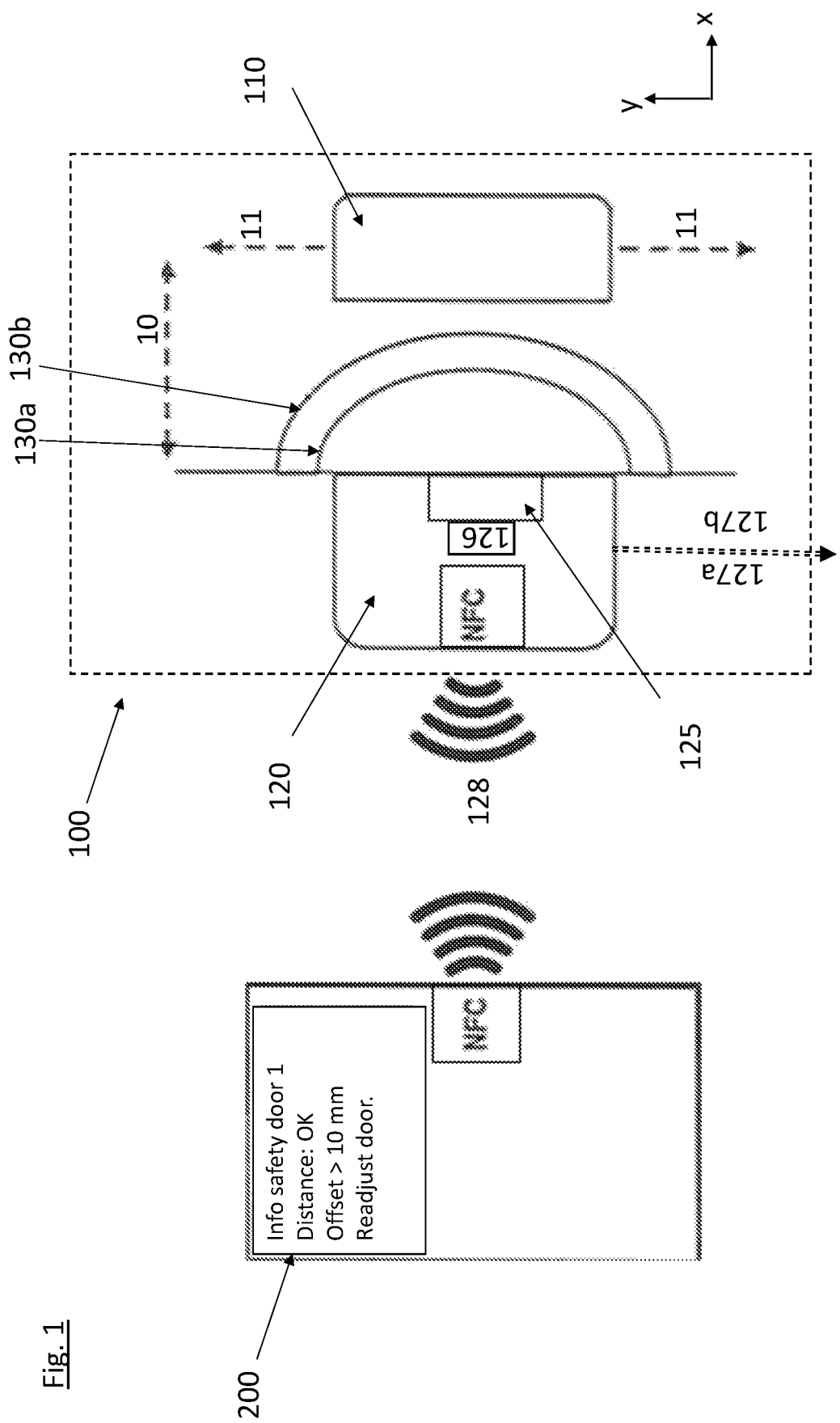
FIG. 1 shows a highly abstracted diagram of a preferred embodiment of a safety switch system according to the invention.

A preferred embodiment of a safety switch system, such as that represented in a highly abstracted form in FIG. 1, includes a safety switch 100, which has a safety device 110 and a detection device 120.

Detection device 120 is equipped to monitor the position of the safety device 110 with respect to a safety zone 130a, 130b and thus in particular to also perform detection within a maximum response or detection range of the detection device 120.

Detection devices designed for position monitoring are known per se to those skilled in the art and may operate according to optical, capacitive, inductive and/or magnetic measurement principles, for example. The choice of the specific detection device may often depend on the material of the object to be detected and/or the specific application. Furthermore, depending on the type of detection device 120, a (maximum) possible response area that can be monitored may be predetermined or may also be adjustable, so that position monitoring can be carried out within this range. Consequently, the safety zone 130a, 130b, with respect to which the position of the safety device 110 is to be detected, is within or corresponds to such a response area. Such a response area is represented by the arrows 10 and 11 in a two-dimensional XY plane in FIG. 1, for example, where arrow 10 represents a maximum distance in X direction from a signal receiving unit 125 of detection device 120, and arrows 11 represent a maximum offset in Y direction from the receiving unit 125 of the detection device 120. The response area may also extend along a third dimension.

Detection device 120, comprised of safety switch 100 in FIG. 1, preferably operates with Hall sensors, for example, so that a semiconductor element, which is accommodated in the signal receiving unit 125 and through which current flows is under a constant magnetic prestress by a magnetic field of a permanent magnet, which is permanently installed behind the semiconductor element but is not specifically visible in FIG. 1 for reasons of simplicity. If the safety device 110, which is made of a ferromagnetic material in this case, is introduced into this magnetic field, its field strength is influenced, so that a change in voltage in the semiconductor element can be detected. The resulting voltage signal, which is usually sinusoidal, can then expediently be converted into a square wave signal and amplified by an internal electronic system 126, which is also included in or coupled to the signal receiving unit 125. According to the current state of the art, safety switches having a detection device 120 with Hall sensors, for example, are capable of detecting and/or monitoring a response area that results from the maximum distance 10 between the detection device 120, in particular the receiving unit 125, and the safety device 110, which thus function as switch elements of the safety switch, as well as resulting from a maximum offset 11 on both sides of the safety device 110 in Y direction, each typically being in the range of 10 to 15 millimeters. The resulting changes in voltage due to the shift in position of the safety device 110 may expediently be associated with positions within the response area by means of the internal electronic system 126, for example, with the help of a teach-in method carried out previously.

With the safety switch system diagramed in FIG. 1, it is now provided that, according to the invention, the safety zones 130a and 130b, with respect to which the position of the safety device 110 is to be detected, are to be divided into one first subzone 130a and at least one second subzone 130b. This may be done, for example, by means of the aforementioned association between positions and the resulting signal changes, in particular voltage changes.

Furthermore, the safety switch 100 is equipped to recognize at least three conditions as a function of the position of the safety device 110 with respect to the safety zones 130a, 130b. This can be done expediently by means of the aforementioned internal electronic system 126.

Within the scope of the invention, it is provided here that the response to detection of the position of the safety device 110 within the first subzone 130a is to be recognized as the first condition, the response to detection of the position of the safety device in the area of a second subzone 130b is to be recognized as the second condition, and the third condition is recognized when the safety device 110 cannot be detected within either the first subzone 130a or in the area of the second subzone 130b.

The division of the safety zone into one first subzone 130a and at least one second subzone 130b is therefore expediently predetermined, set or otherwise established, so that the first subzone 130a forms a subzone within which the safety device 110 is at a minimum distance and offset from the detection device 120, for example, within a distance and/or offset of up to 10 mm each. The at least one second subzone 130b then forms a subzone, within the range of which the safety device 110 is at a distance and/or offset from the detection device 120 that is greater but can still be classified as allowed, for example, within a distance and/or offset of more than 10 mm up to 15 mm. If the safety device 110 cannot be detected within the first subzone 130a or in the area of the at least one second subzone 130b, then consequently, the safety device 110 is at a distance and/or offset from the detection device 120, which goes beyond that and is consequently is no longer allowed and is therefore safety critical, but due to the application is still within the maximum response area or may already be outside of the maximum response area.

The safety switch 100, in particular the internal electronic system 126, is also equipped so that recognition of the third condition can be signaled, in particular is signaled, by a safety-oriented release signal 127a for releasing of a predetermined safety-oriented reaction, and/or so that the recognition of the first and/or second condition(s) can be signaled, in particular is signaled by an information signal 128 with data pertaining to the respective condition to a display device 200 connected thereto, in particular by wireless connection.

For releasing of a safety-oriented reaction as a result of signaling of the recognition of the third condition by a safety-oriented release signal 127a, the safety switch 100 may expediently be coupled to a safety-oriented reaction device (not shown in the drawings for the sake of simplicity), which shuts down a machine, for example, in order to safely counteract a safety-critical condition and to safely prevent any potential risk for a human, for example. The safety device 110 may thus be mounted on a protective device such as a door, for example, which separates a safety area in a machine. Consequently, the safety device 110 would move out of the safety zone 130a, 130b when the door is opened and would thus not be detectable either within the first subzone 130a or in the area of the second subzone 130b.

The safety switch 100 may also be equipped with respect to recognition of the first condition, such that the condition corresponds to a non-safety-critical condition, which can be signaled accordingly by the information signal 128 with data pertaining to the non-safety-critical condition. In the above example of a safety device 110 mounted on a safety device that separates a safety area in machines, it would thus be possible to signal that the safety device such as a door, for example, has been closed correctly.

The safety switch 100 may also be equipped with respect to the recognition of the second condition, for example, so that this represents a condition which does not conform completely or at all to a safety-relevant requirement but nevertheless can be classified as non-safety-critical and which accordingly can be signaled by the information signal 128 with data pertaining to this condition. In the above example of a safety device 110 mounted on a protective device that separates a safety area in machines, it could thus be signaled that the safety device such as a door, for example, is no longer closed as required but nevertheless can be classified as closed, for example, because the safety device has become stuck in relation to a frame accommodating the safety device or deformation of the suspension of the safety device.

In FIG. 1, although the safety device 110 according to the diagram is neither inside the first subzone 130a nor in the area of the second subzone 130b and consequently can no longer be detected in any of these subzones, nevertheless a possible information signal 128, which is displayed on the display device 200 and has data pertaining to the second condition, is also illustrated as an example. Depending on the embodiment, other information with respect to a second condition may of course also be signaled and/or displayed, for example, signaling and/or indicating only that the safety device is in a borderline range.

Additionally or alternatively, in particular in response to recognition of the first and/or second condition(s), the safety switch 100 can also generate at least one approval signal 127b to induce the approval of a safety-critical process within the scope of the invention. In a preferred embodiment with the aforementioned safety-oriented reaction device, the safety switch 100 may also be coupled accordingly for signaling such an approval 127b or may be coupled to a separate approval device (not shown in the figure), likewise for reasons of simplicity.

The safety device 100 thus functions more or less as a type of "actuator," wherein a safety output of the detection device, for example, switches to a LOW signal level and this can be signaled accordingly as the release signal for shutdown of a machine if the "actuator" is not in the range of the safety zone. If the safety device 100 that functions as an "actuator" is within the first subzone or at least in the range of the second subzone, the safety output of the detection device switches to a HIGH signal level, for example, which can optionally be signaled accordingly as an approval signal for startup or continued operation of the machine.

Additionally or alternatively, the safety switch 100 may also be equipped to signal this through an information signal 128 with data pertaining to the third condition to a display device 200 that is connected, in particular in a wireless connection, within the scope of the invention.

In one embodiment diagramed in FIG. 1, the safety switch 100 and the display device 200, which is connected thereto, namely by wireless connection in the example shown here, have an NFC chip set and an NFC antenna in particular, where NFC is known to stand for "near field communication". An information signal 128 that can be signaled to the display device 200 and comprises data pertaining to the respective condition may then be sent, for example, directly to and/or in closest proximity to the safety switch on a handheld device or a smartphone as the display device 200 or may be read out by same and displayed there.

Signaling 128 of the information signal with data pertaining to the respective condition from the safety switch 100 to the display device 200 in communication therewith may thus take place through active transmission or by readout, depending on the specific embodiment.

Reading out or receiving information about a prevailing switch distance and offset of the safety device 110 from the detection device 120 and then displaying said information accordingly can make it possible for a machine operator or maintenance person, for example, to draw conclusions in the simplest way possible about the prevailing position of a protective device on which the safety device is arranged and to optionally initiate preventive corrections.

According to an expedient refinement, the safety switch 100 of the safety switch system according to the invention is also equipped to update the information signal 128 in predetermined intervals that can be transmitted between the safety switch 100 and the display device 200.

For this case in particular, the display device 200 is advantageously equipped to compare an information signal 128 updated at a first point in time with an information signal updated at a subsequent second point in time and to display the result of the comparison. It is possible in this way to detect a change as soon as possible, in particular a change in position from one condition in the direction of another condition, in particular in the direction of a safety-critical condition, and to also respond accordingly as a result, if necessary.

Furthermore, in particular for an unambiguous allocation of the information displayed on the display device 200, the safety switch 100 preferably has coding, in particular in the manner of a device identifier and/or in particular RFID coding (RFID stands for radio frequency identification, i.e., identification by means of electromagnetic waves), and is also equipped so that this coding can be transmitted together with the information signal 128 between the safety switch and the display device 200. Such coding may also offer good protection against manipulation. Thus, in particular when using a plurality of safety switches 100, any changes in position, whether intentional or unintentional, can be localized and identified immediately and unambiguously.

Figure 2:
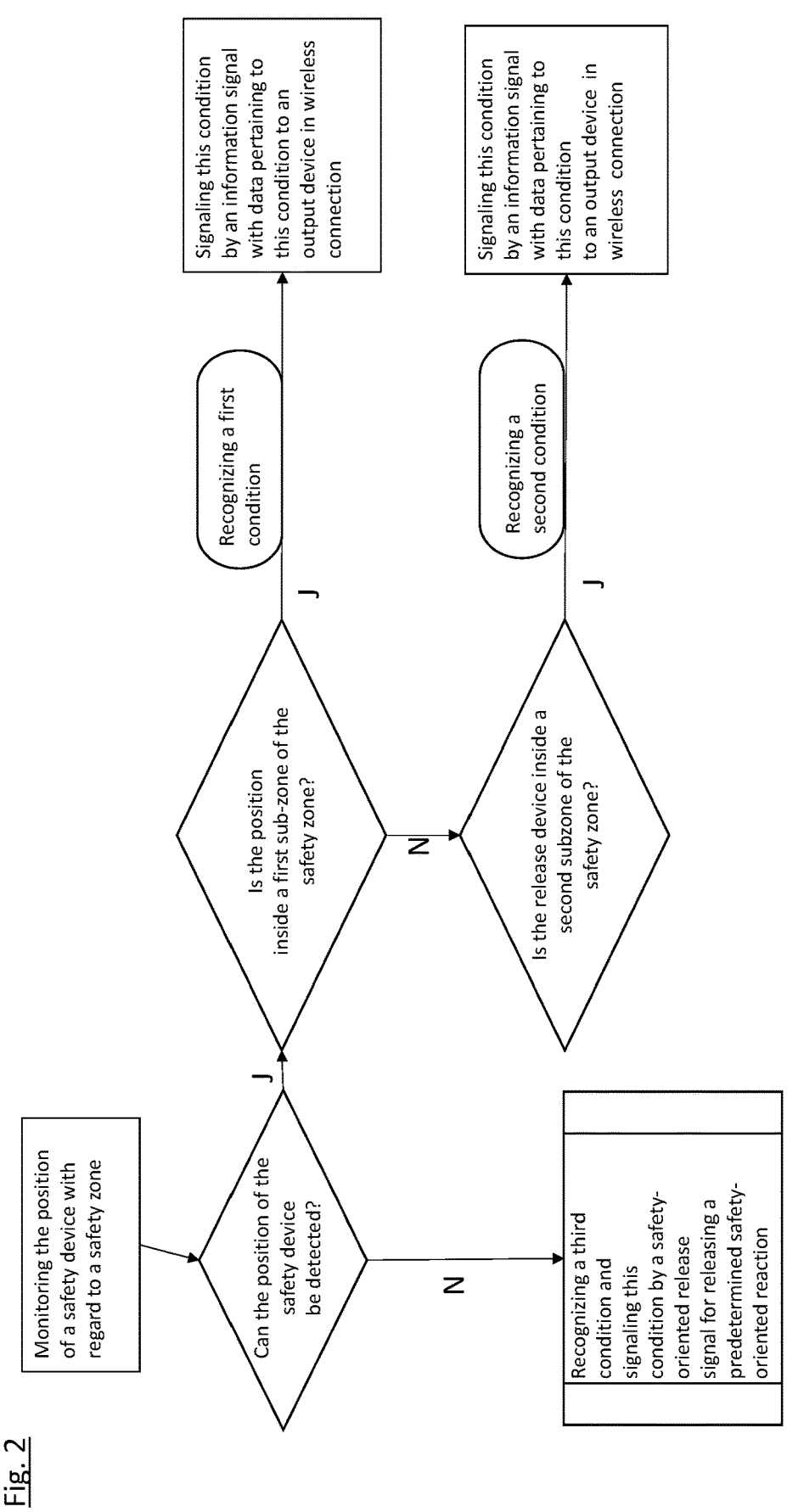
FIG. 2 shows a greatly simplified flow chart relating to an example of a possible and preferred sequence of a method according to the invention.

FIG. 2 shows a highly simplified flow chart pertaining to an example of a possible preferred sequence of a method according to the invention, based on which the position of a safety device with respect to a safety zone to be monitored with regard to the safety device can be signaled, in particular based on a safety switch system described according to the invention.

Specifically with reference to FIG. 2 in this regard, the position of a safety device is monitored with respect to the safety zone, which is done in particular by means of a detection device, such as that described above, wherein the choice of the specific detection device here can often depend on the material of the object to be detected and/or the specific application.

If the detection device is thus fundamentally equipped to be able to detect the position of the safety device within a predetermined response area of the detection device, which includes or corresponds to the safety zone to be monitored within the scope of the invention, at least inasmuch as the safety device is located inside or at least in the area of the safety zone, three cases are differentiated in particular during the monitoring.

If a position of the safety device with regard to the safety zone can be detected, then the response to a detected position of the safety device within a first subzone can be recognized as the first condition and in response to the detection of the safety device in the area of a second subzone can be recognized as a second condition.

If a position of the safety device with regard to the safety zone cannot be detected, i.e., the safety device is not detected within the first subzone or in the area of at least one second subzone, then this is recognized as the third condition.

Depending on the specific design, then in the case of recognition of the third condition, this is signaled by a safety-oriented release signal for releasing of a predetermined safety-oriented reaction and in the case of recognition of the first and/or second conditions, this is signaled by an information signal with data pertaining to the respective condition to a display device in a wireless connection in particular.

Signaling of the information signal with data pertaining to the respective condition from the safety switch to the display device connected to it can take place here by active transmission or by readout, depending on the specific design.

The division of the safety zone into the first subzone and the at least one second subzone may take place based on the respective received detection signal, for example.

It can be seen by those skilled in the art from the above description that the information pertaining to the first and/or second conditions in particular can be utilized advantageously to provide information to the user about the position of a protective device, for example, a door on which the safety device is mounted. The information would thus expediently be useful and of great benefit in setting up a machine in a factory and in ongoing operation. The subject matter of the invention may thus essentially contribute to a greater productivity and reduced machine downtimes.

In summary, the safety switch 100 in the scope of the invention and in particular the detection device 120 are thus equipped to detect the presence of the safety device 120 within at least two preset detection response areas, and wherein the safety switch is equipped to sense and/or signal at least three conditions: a first condition in response to detection of the safety device 120 within a first preset detection response area, a second condition in response to detection of the safety device 120 in the area of at least one second preset detection response area, and a third condition, if the safety device 120 cannot be detected by means of the detection device 120, either within the first preset detection response area or the at least one second preset detection response area.

Consequently, the touch-free coded safety switches currently available for secure monitoring of the position of separating protection devices in machines can be optimized significantly by means of the subject matter according to the present invention.

LIST OF REFERENCE NUMERALS

100 Safety switch
110 Safety device
120 Detection device
130a, 130b Subzones of a safety zone
125 Signal receiving unit
126 Internal electronic system
127a Release signal 127a
12b Approval signal
128 Information signal
200 Display device
10 Distance
11 Offset

The invention claimed is:

1. A method for signaling the position of a safety device with respect to a safety zone to be monitored with regard to the safety device, characterized in that for monitoring the safety zone, the position of the safety device is detected with a detection device, and the safety zone is divided into a first subzone and at least one second subzone, within which the safety device is at a minimum distance and offset from the detection device, and at least one second subzone, within the range of which the safety device is at a distance and/or offset from the detection device that is greater but can still be classified as allowed, as well as—in response to a detected position of the safety device within the first subzone, this is recognized as a first, non-safety-critical condition, in response to detection of the safety device in the area of a second subzone, this is recognized as a second, non-safety-critical classifiable condition, and a third, safety-critical condition is recognized when the position of the safety device is such, that the safety device is not detected either within the first subzone or in the area of the at least one second subzone, and in that recognition of the third, safety-critical condition is signaled by a safety-oriented release signal for releasing of a predetermined safety-oriented reaction and/or recognition of the first, non-safety-critical condition and/or the second, non-safety-critical classifiable condition is signaled by an information signal with data pertaining to the respective condition to a display device.

2. A safety switch system having a safety switch, which has a safety device and a detection device, wherein the detection device is equipped to detect the position of the safety device within a safety zone which is divided into one first subzone within which the safety device is at a minimum distance and offset from the detection device, and at least one second subzone within the range of which the safety device is at a distance and/or offset from the detection device that is greater but can still be classified as allowed, and wherein the safety switch is equipped to recognize at least three conditions as a function of the position of the safety device with respect to the safety zone, wherein in response to detection of the position of the safety device within the first subzone, this can be recognized as a first non-safety-critical condition, in response to detection of the position of the safety device in the area of a second subzone, this can be recognized as a second, non-safety-critical classifiable condition, and it can be recognized as a third, safety-critical condition if the safety device is in a position in which the safety device cannot be detected either within the first subzone or in the area of the at least one second subzone, and wherein the recognition of the third condition can be signaled by a safety-oriented release signal for releasing of the predetermined safety-oriented reaction and/or recognition of the first, non-safety-critical condition and/or the second, non-safety-critical classifiable condition can be signaled by an information signal with data pertaining to the respective condition to a display device.

3. The safety switch system according to claim 2 wherein the safety switch has coding and is equipped so that this coding can be transmitted wirelessly together with the information signal between the safety switch and the display device.

4. The safety switch system according to claim 2, wherein the safety switch and the display device each have an NFC transmission/receiving unit.

5. The safety switch system according to claim 2, wherein the safety switch is equipped to update the information signal in predetermined intervals that can be transmitted between the safety switch and the display device.

6. The safety switch system according to claim 5, wherein the display device is equipped to compare an information signal updated at a first point in time with an information signal updated at a subsequent second point in time and to display the result of this comparison.

7. The safety switch system according to claim 2, wherein the safety switch is coupled to a safety-oriented reaction device for releasing of a safety-oriented reaction and/or is designed to generate an approval signal for inducing approval of a safety-critical process in response to the first, non-safety-critical condition and/or the second, non-safety-critical classifiable condition.

8. The method for signaling the position according to claim 1, wherein the recognition is signaled to the display device in a wireless connection.

9. The safety switch system according to claim 2, wherein the safety switch is equipped to signal the recognition to the display device in a wireless connection.

* * * * *